(12) United States Patent
Sirigiri

(10) Patent No.: US 12,333,030 B2
(45) Date of Patent: Jun. 17, 2025

(54) DELEGABLE RIGHT TO PRINT

(71) Applicant: Hewlett-Packard Development Company, L.P., Spring, TX (US)

(72) Inventor: Sekhar Sirigiri, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 160 days.

(21) Appl. No.: 18/020,933

(22) PCT Filed: Apr. 19, 2021

(86) PCT No.: PCT/US2021/070408
§ 371 (c)(1),
(2) Date: Feb. 11, 2023

(87) PCT Pub. No.: WO2022/040648
PCT Pub. Date: Feb. 24, 2022

(65) Prior Publication Data
US 2023/0315876 A1   Oct. 5, 2023

(30) Foreign Application Priority Data
Aug. 20, 2020 (IN) .............................. 202041035988

(51) Int. Cl.
*G06F 21/60* (2013.01)

(52) U.S. Cl.
CPC .......... *G06F 21/608* (2013.01); *G06F 21/602* (2013.01)

(58) Field of Classification Search
CPC ... H04L 9/3236; H04L 9/3239; H04L 9/3247; H04L 9/3297; H04L 9/50
See application file for complete search history.

(56) References Cited

U.S. PATENT DOCUMENTS

| | | | |
|---|---|---|---|
| 8,209,762 B2 * | 6/2012 | Hong | H04N 1/00846 726/31 |
| 8,245,306 B2 | 8/2012 | Gimenez | |

(Continued)

FOREIGN PATENT DOCUMENTS

| | | |
|---|---|---|
| JP | 2009-258251 A | 11/2009 |
| WO | 2019/067409 A1 | 4/2019 |

OTHER PUBLICATIONS

Dai, Bingrong, et al. "Research and implementation of cross-chain transaction model based on improved hash-locking." Blockchain and Trustworthy Systems: Second International Conference, BlockSys 2020, Dali, China, Aug. 6-7, 2020.*

(Continued)

*Primary Examiner* — John M Macilwinen
(74) *Attorney, Agent, or Firm* — Michael Dryja

(57) ABSTRACT

A publisher device receives a blockchain transaction of a request to print content from a user device and generates a print stream of the content. The publisher device sends a blockchain transaction of a right to print the print stream to the user device, which sends a blockchain transaction of the right to print to a printing device. The printing device sends a blockchain transaction of an authorization request to print the print stream to the publisher device, and then receives from the publisher device a blockchain transaction of a link to the print stream at a portal device. The printing device downloads the print stream from the portal device at the link, and prints the print stream.

11 Claims, 8 Drawing Sheets

(56) References Cited

U.S. PATENT DOCUMENTS

| | | |
|---|---|---|
| 8,896,858 B2 | 11/2014 | Zehler |
| 9,165,154 B2 | 10/2015 | Auradkar et al. |
| 10,382,406 B2 | 8/2019 | Pigin |
| 10,725,716 B1 | 7/2020 | de Beus |
| 2011/0026065 A1 | 2/2011 | Bard et al. |
| 2014/0279706 A1 | 9/2014 | Blasko |
| 2019/0101896 A1* | 4/2019 | Cantrell ............. G05B 19/4155 |
| 2019/0180291 A1 | 6/2019 | Schmeling et al. |
| 2019/0294817 A1 | 9/2019 | Hennebert et al. |
| 2019/0373137 A1* | 12/2019 | Krukar .................. H04N 1/444 |
| 2021/0110494 A1* | 4/2021 | Posillico ................. G06F 16/27 |
| 2021/0335041 A1* | 10/2021 | Haslam ................. G06N 20/20 |

OTHER PUBLICATIONS

Pal, Shantanu, et al. "On the design of a flexible delegation model for the Internet of Things using blockchain." IEEE Transactions on Industrial Informatics 16.5: 3521-3530. (Year: 2019).*

Bodo, Z. English translation of DE 102018208972 A1. (Year: 2019).*

Wright, C. and Savanah, S. English translation of TW 201732705 A. (Year: 2017).*

Covaci et al. English translation of KR 20200080265 A. July. (Year: 2020).*

Poon, Joseph, and Thaddeus Dryja. "The bitcoin lightning network: Scalable off-chain instant payments." (Year: 2016).*

* cited by examiner

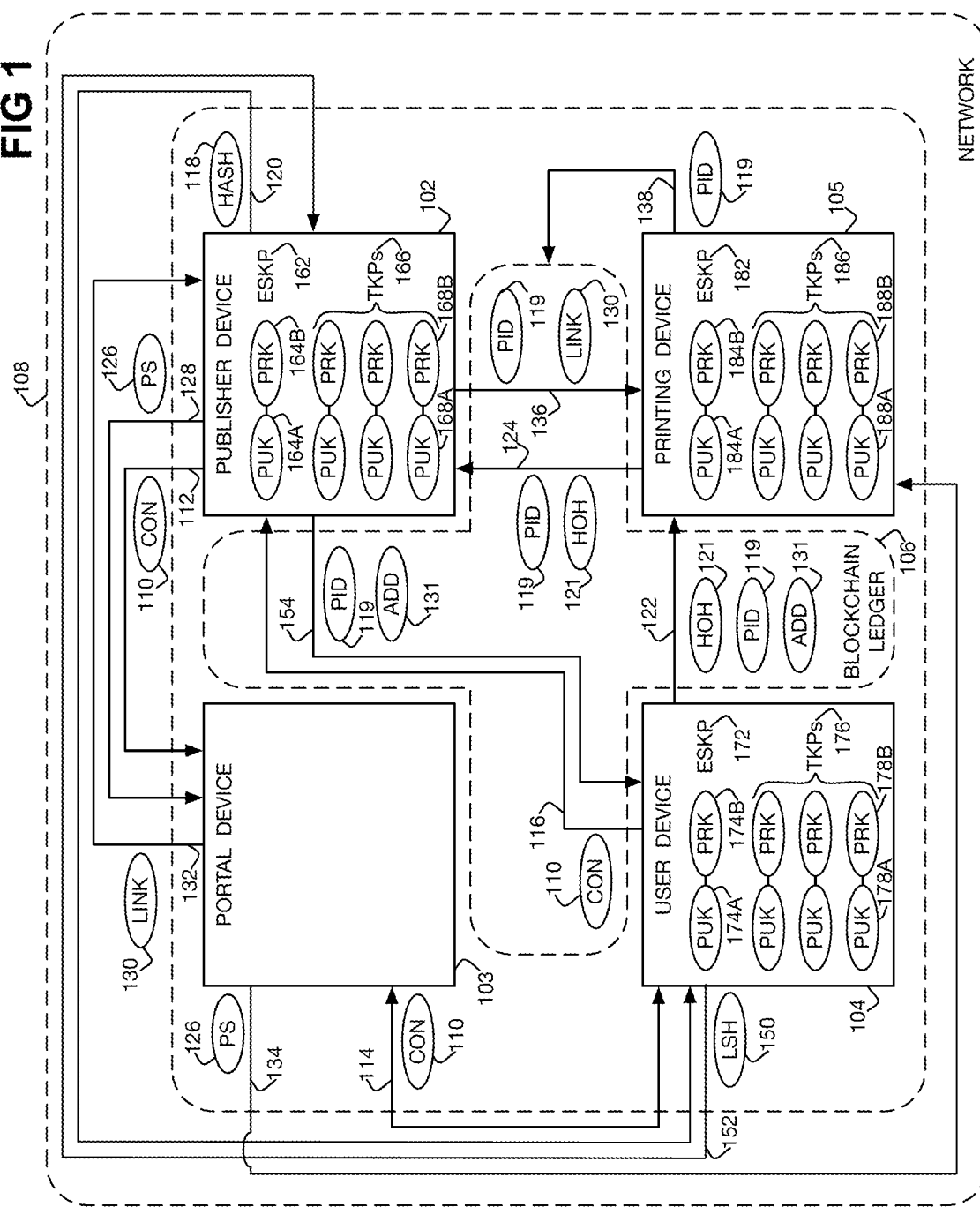

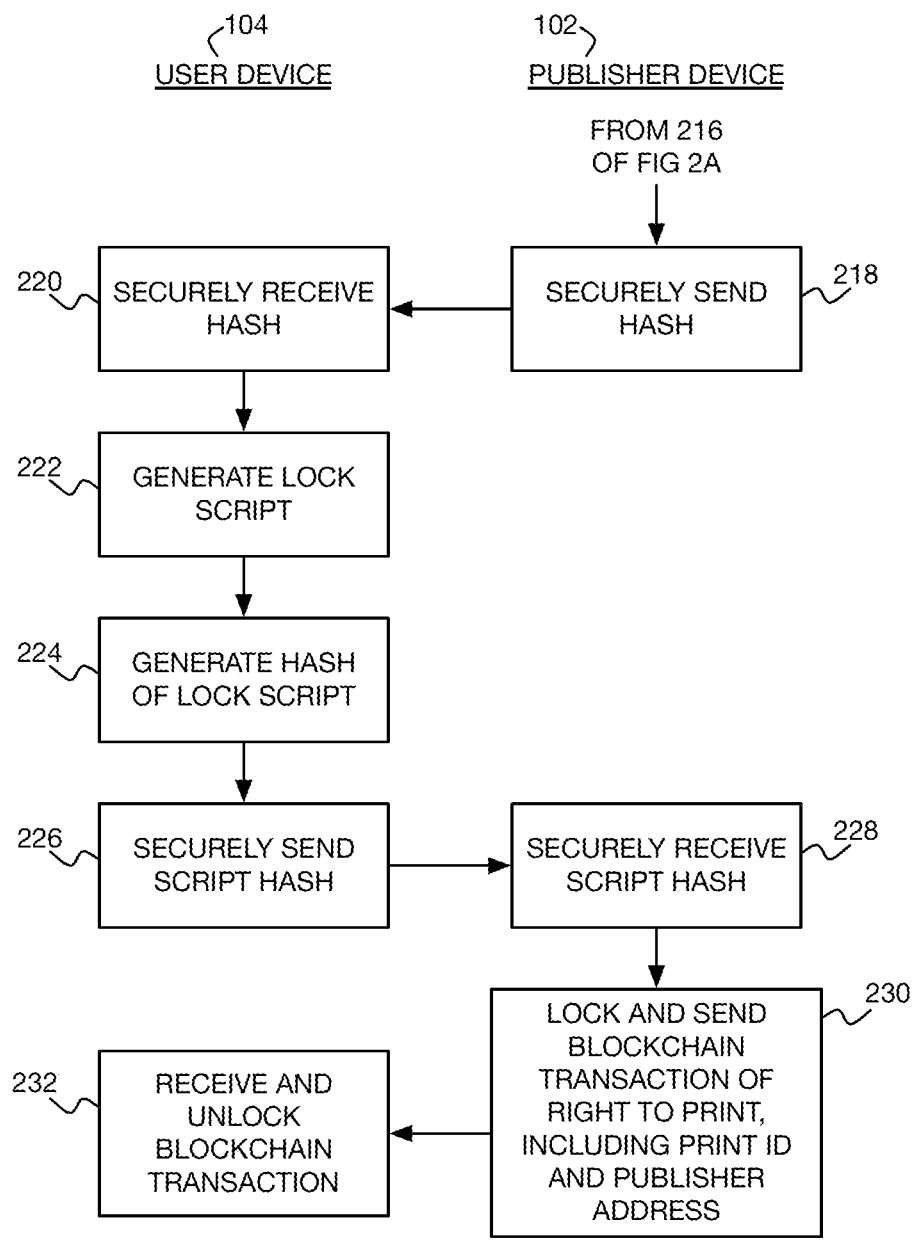

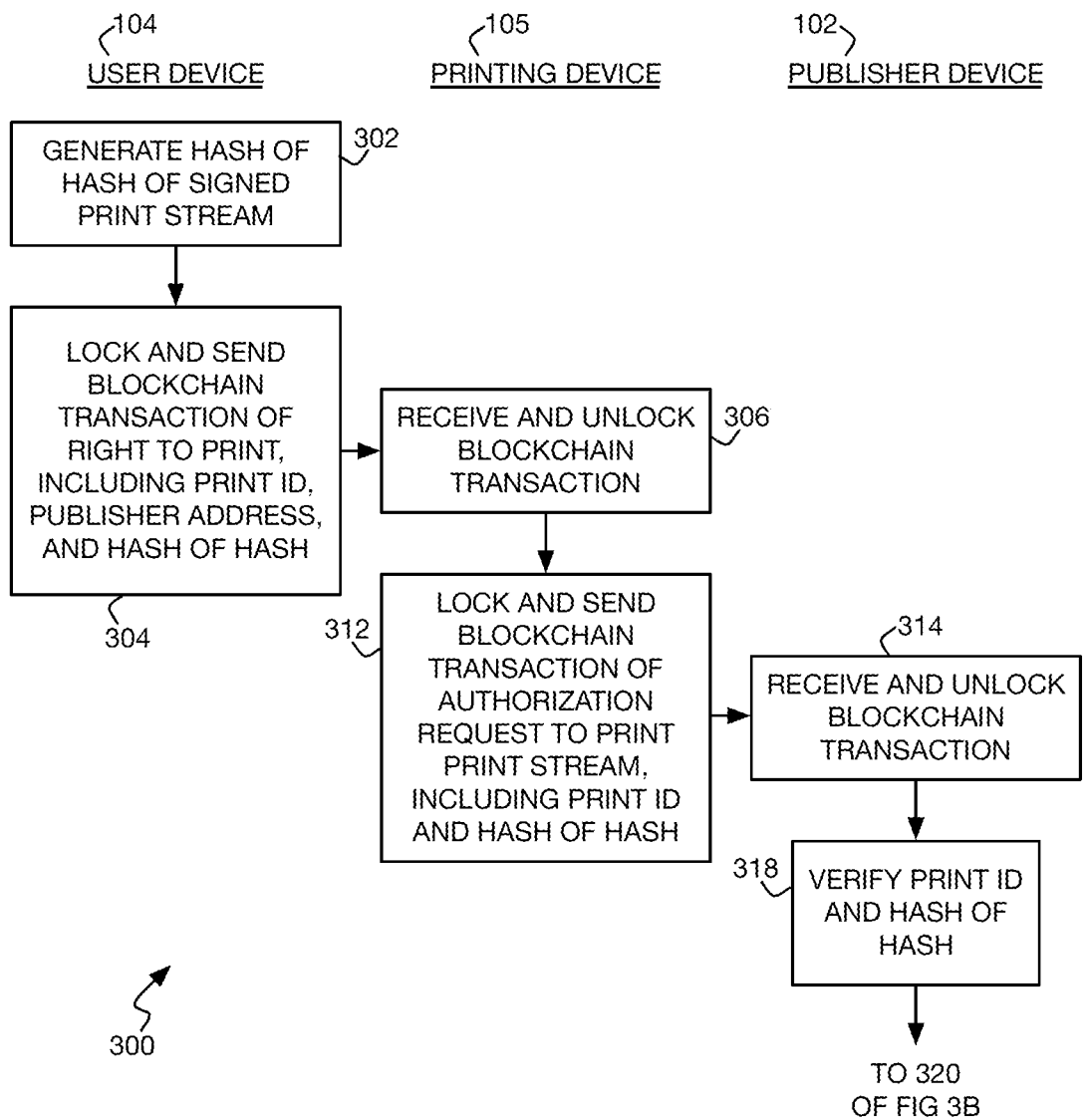

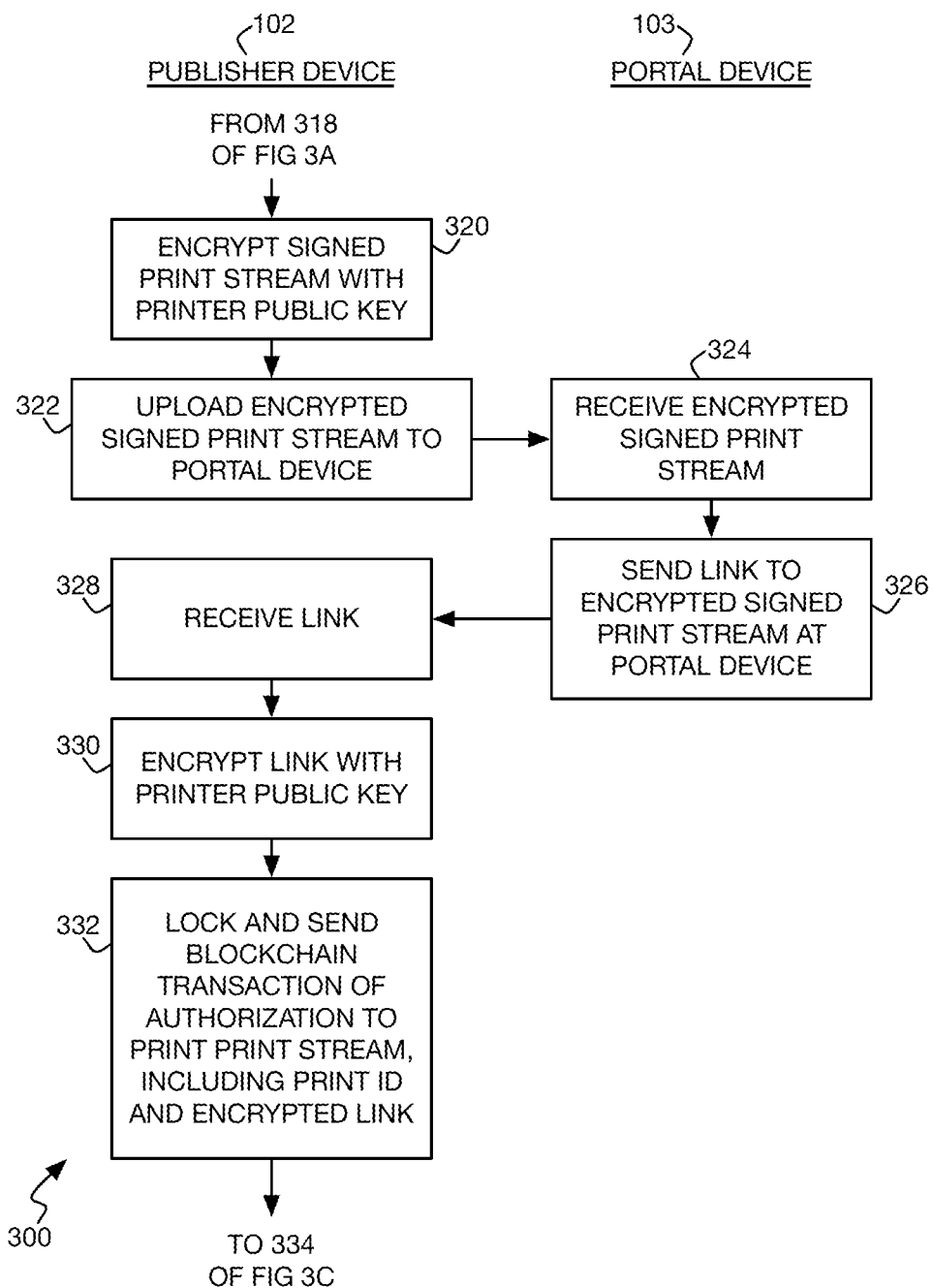

DELEGABLE RIGHT TO PRINT

BACKGROUND

Printed content can include books, magazines, letters, photographs, and a plethora of other kinds of content. Traditionally a user acquired printed content in one of two ways. First, a printing or publishing company may have had preprinted a number of copies of the content; the user then acquired the printed content, if in stock, from the printing or publishing company or from a reseller or other party. Second, a user may have had acquired a digital version of the content, and then printed the content him or herself, or uploaded the content to a printing service provider to print the desired number of copies.

BRIEF DESCRIPTION OF THE DRAWINGS

FIG. 1 is a diagram of an example zero-trust system in which a user device is accorded a delegable right to print, a publisher device has a self-sovereign identity as to content, and provenance from print request through print authorization is established.

FIGS. 2A and 2B are flowcharts of an example method for providing a user device with a delegable right to print, in which a publisher device maintains a self-sovereign identity as to content and provenance is established.

FIGS. 3A, 3B, and 3C are flowcharts of an example method for delegating a delegable right to print from a user device to a printing device, in which a publisher device maintains a self-sovereign identity as to content and provenance is established.

DETAILED DESCRIPTION

Figure 2A:
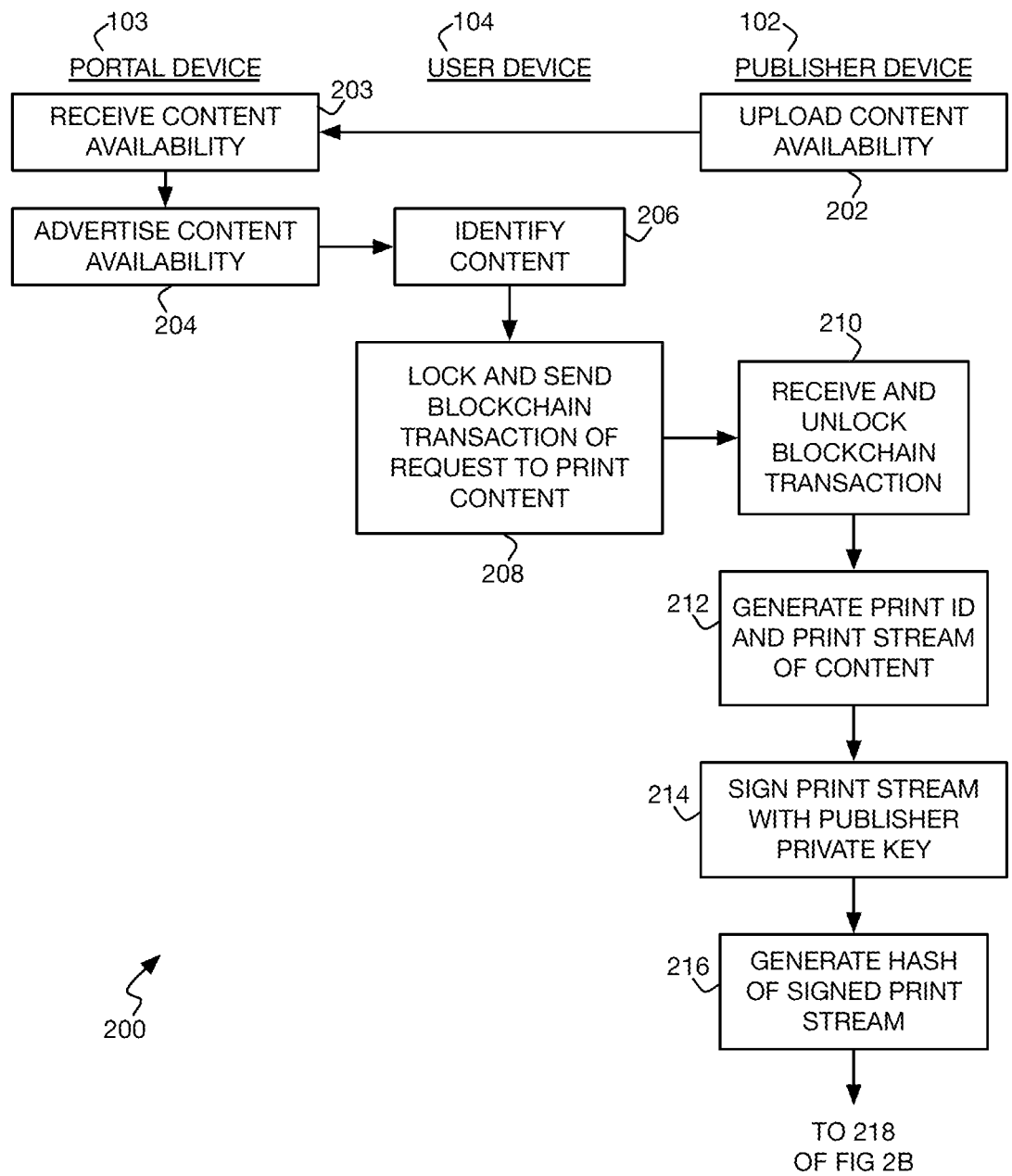

As to compared to traditional ways by which users have acquired printed content, more recently print on demand technologies have been developed, in which content is not printed by or for a print on demand provider until requested by a user. The user does not have to ever receive a digital version of the content. Rather, the user requests a printed copy of content, such as by placing an order with a print on demand provider, and the print on demand provider may itself then print the content, or arrange for a trusted printing service provider to print the content on its behalf for the user.

Existing print on demand technologies are predicated on trust among the print on demand provider, the content provider, the printing service provider, and the user. The content provider has to trust the print on demand provider with its content. Even with more recently developed "bring your own keys" (BYOK) methodologies, in which content providers furnish the cryptographic keys used to secure their content, the keys may still be shared with the print on demand provider, meaning that the print on demand provider effectively has unfettered access to the content.

The print on demand provider (and by extension, the content provider) also has to trust the printing service provider, if one is used to print the content requested by the client. In effect this has resulted in print on demand providers either printing the content themselves, or curating a limited list of printing service providers that they use to print content. Similarly, it has become evident that print on demand providers usually work with a limited number of large content providers, or else insist that content providers blindly trust the print on demand providers with their content.

The user who wishes to print content on demand in all of this is left with meager choices. The portals operated by print on demand providers may have limited content selection, with different content providers selecting different print on demand providers for hosting their content for on-demand printing. The user may thus have to visit a variety of different portals to obtain desired content. Further, the user may not be able to use a desired printing service provider to print content, with different print on demand providers having their own trusted printing service providers.

Techniques described herein ameliorate these and other difficulties. The techniques novelly leverage blockchain technology and public-private key cryptographic to provide a zero-trust architecture in which users and print on demand, content, and printing service providers do not have to trust one another. A user receives a delegable right to print within the described architecture, permitting the user to delegate the right to print to any printing device, even if not operated by a printing service provider, and without preapproval or prior curation by the print on demand or content provider, while still maintaining the security of the content to be printed.

The content providers, referred to as publishers herein, have self-sovereign identities, in that they themselves maintain the cryptographic keys by which their content is secured, without having to share the keys with the providers operating the print on demand portals, with the users, or with printing devices. Neither the user nor the portal ever has access to the complete unencrypted content. Further, due to the usage of blockchain, the described techniques imbue the entire process with provenance: from the initial user request to print content sent to a publisher through the final publisher authorization to print the content provided to a printer, transactions among the parties are indelibly and immutably recorded.

FIG. 1 shows an example system 100. The system 100 includes a publisher device 102, a portal device 103, a user device 104, and a printing device 105. The publisher device 102 may be a computing device such as a computer like a desktop or laptop computer, a server, or another type of computing device. The portal device 103 may also be a computing device like a server or another type of computing device. The user device 104 may similarly be a computing device, such as a computer like a desktop or laptop computer, or another type of computing device, including a mobile computing device such as a smartphone or tablet computing device. The printing device 105 may be a standalone printer or an all-in-one (AIO) printing device that includes other functionality in addition to printing functionality. The printing device 105 can in one implementation include a front-end print server, which be shared by a number of printing devices.

The publisher device 102 is operated by or for a content provider. The portal device 103 is operated by or for a portal provider, such as a print on demand provider advertising availability of different content from the same or different publishers. The printing device 105 is operated by or for a provider of the printing device 105, such as a printing service provider. The same party may be the provider of more than one of the devices 102, 103, and 105. The devices 102, 103, and 105 may be located at the same or different locations. The user device 104 is operated by a user, such as a customer, consumer, or other end user, who wishes to acquire a printed copy of content.

The publisher device 102, the user device 104, and the printing device 105 are communicatively connected to one another via a blockchain ledger 106. That is, the devices 102, 104, and 105 can transmit blockchain transactions to one another by recording them on the blockchain ledger 106. The devices 102, 104, and 105 may correspondingly receive notification that blockchain transactions sent to them have been recorded on the blockchain ledger 106 for retrieval. The blockchain ledger 106 may be publicly or privately operated, and distributed copies of the ledger 106 may be maintained by the devices 102, 104, and 105 and/or by other devices, which operate the blockchain ledger 106.

The portal device 103 is communicatively connected with the publisher device 102, the user device 104, and the printing device 105 via a network 108. The network 108 may be or include the Internet, as well as other types of networks, such as extranets, intranets, wide-area networks, local-area networks, and so on. Access of the blockchain ledger 106 may be via the network 108 or another network. For instance, the devices that operate the blockchain ledger 106 distribute blockchain transactions posted to the ledger 106 among one another via network communication in order to maintain the blockchain ledger 106.

The publisher device 102 has a cryptographic encryption-signature key pair 162 including a public key 164A and a corresponding private key 164B, which are collectively referred to as the keys 164. The encryption-signature key pair 162 can be used by the publisher device 102 to authenticate data. Specifically, the publisher device 102 digitally signs the data with the private key 164B, and any other device can verify the authenticity of the signed data using the public key 164A.

The encryption-signature key pair 162 can also be used by other devices to send encrypted data to the publisher device 102. Specifically, a device digitally encrypts the data with the public key 164A, and the publisher device 102 can decrypt the data with the private key 164B. The publisher device 102 can share the public key 164A with other devices, but confidentially maintains and does not share the private key 164B. The publisher device 102 may have just one encryption-signature key pair 162, and the keys 164 of the key pair 162 can be reused.

The publisher device 102 has multiple cryptographic transaction key pairs 166, three of which are depicted in FIG. 1 for illustrative purposes. Each transaction key pair 166 includes a public key 168A and a corresponding private key 168B, which are collectively referred to as the keys 168. Each transaction key pair 166 is used once, for one transaction, and is not reused. The publisher device 102 can share a hash of the public key 168A with the other device of the transaction in question, and confidentially maintains and does not share the corresponding private key 168B. The publisher device 102 may pre-generate a number of the transaction key pairs 166, or may generate a key pair 166 each time there is a new transaction.

For a sending device to send a locked first blockchain transaction to the publisher device 102 via the blockchain ledger 106, the sending device requests that that the publisher device 102 provide a hash of a public key 168A of a transaction key pair 166 for the first transaction. The sending device locks the first blockchain transaction to the provided hash of the public key 168A. The locked first transaction is addressed to the hash of the public key 168A, and the sending device posts the locked first transaction to the blockchain ledger 106. That is, the sending device broadcasts the locked first transaction, addressed to the hash of the public key 168A, on or over the blockchain ledger 106. The publisher device 105 retrieves the locked first transaction from the ledger 106, and unlocks it with public key 168A.

The publisher device 105 may in turn send a locked second blockchain transaction that is linked to the first blockchain transaction, to a receiving device via the blockchain ledger 106. The publisher device 105 requests that the receiving device provide a hash of a public key of a transaction key pair for the second transaction. The publisher device 105 signs the second transaction with the private key 168B corresponding to the public key 168A of the first transaction. The publisher device 105 locks the second transaction to the provided hash of the public transaction key for the second transaction. The publisher device 105 posts the second locked blockchain transaction, addressed to the provided public key hash, to the blockchain ledger 106.

The publisher device 105's transaction key pair 166 for the first blockchain transaction is thus used in two ways. First, the first transaction (from the sending device to the publisher device 105) is locked and addressed to the hash of this key pair 166's public transaction key 168A on the blockchain ledger 106. Locking the first transaction to this public key 168A ensures that until the second blockchain transaction linked to the first transaction is posted on the blockchain ledger 106, no device other than the publisher device 105 can unlock the first transaction, since no other device will have the public key 168A.

Second, as posted on the blockchain ledger 106, the second blockchain transaction (from the publisher device 105 to the receiving device) is signed with the private key 168B of the key pair 166 for the first transaction. The public key 168A of this key pair 166 is provided on the blockchain ledger 106 with the second transaction. Therefore, once the second transaction has been posted on the blockchain ledger 106, any other device can verify that the publisher device 105 was permitted to link the second transaction to the first transaction, by authenticating the signed second transaction against the provided public key 168A.

The transaction key pair 166 for the first transaction is thus used just for the first transaction, and is not reused for any other transaction. The public transaction key 168A is used in that the first transaction is locked to the hash of the public key 168A on the blockchain ledger 106, and the first transaction is addressed to this public key hash on the ledger 106. The private transaction key 168B is used to sign any blockchain transaction from the publisher device 105, such as the second transaction, which is linked to the first transaction. The public key 168A is provided with any such linked transaction on the blockchain ledger 106, to permit verification that the publisher device 105 was indeed the recipient of the first transaction and thus permitted to post a new transaction on the ledger 106 linked to the first transaction.

When a transaction is sent from one device to another device, a data item can be provided as part of the transaction posted on the blockchain ledger 106, in encrypted or plaintext (i.e., unencrypted) form. In the case of the described first blockchain transaction from the sending device to the publisher device 104, for instance, the sending device may encrypt such a data item with the public encryption-signature key 164A of the publisher device 102, or may leave the data item in unencrypted form. The data item becomes part of the blockchain transaction. If encrypted, the data item can be decrypted with the corresponding private encryption-signature key 164B by just the publisher device 104, which confidentially maintains the private key 164B.

If there are multiple data items to be provided in encrypted form as part of a blockchain transaction from a sending device to a receiving device, they can be provided in two ways. First, the sending device may separately encrypt each data item with the public encryption-signature key of the receiving device, such that the receiving device separately decrypts each data item with its private encryption-signature key. Second, the sending device may concatenate or otherwise merge the data items into one data item, and then encrypt just this data item with the public key of the receiving device. The receiving device decrypts the encrypted data item with its private key and then separates out the constituent data items.

As with the publisher device 105, the user device 104 has a cryptographic encryption-signature key pair 172 including a public key 174A and a corresponding private 174B, which are collectively referred to as the keys 174. The encryption-signature key pair 172 is used by and for the user device 104 in the same manner in which the encryption-signature key pair 162 is used by and for the publisher device 102 as has been described. The user device 104 likewise has multiple cryptographic transaction key pairs 176, three of which are depicted in FIG. 1 for illustrative purposes. The transaction key pairs 176 are used by and for the user device 104 in the same way in which the transaction key pairs 168 are used by and for the publisher device 102 as has been described.

The printing device 105 can also have a cryptographic encryption-signature key pair 182 including a public key 184A and a corresponding private key 184B, which are collectively referred to as the keys 184. The encryption-signature key pair 182 is used by and for the printing device 105 in the same manner in which the encryption-signature key pair 162 is used by and for the publisher device 102. The printing device 105 likewise also has multiple cryptographic transaction key pairs 186, three of which are depicted in FIG. 1 The transaction key pairs 186 are used by and for the printing device 105 in the same way in which the transaction key pairs 168 are used by and for the publisher device 102.

The process by which a delegable right to print is accorded by the publisher device 102 to the user device 104 is described with reference to FIGS. 2A and 2B, which show an example method 200. The method 200 can be implemented as program code stored on a non-transitory computer-readable data storage medium and executable by a processor. The processor may be a processor of the publisher device 102, the portable device 103, or the user device 104. The method 200 is described in relation to one content, such as one document or set of documents, one book or set of books, one image or set of images, or another type of printable content.

In FIG. 2A, the portal device 103 performs the left column, the publisher device 102 performs the right column, and the user device 104 performs the middle column. The publisher device 102 uploads availability of one content 110 to the portal device 103 via the network 108 (202), which the portal device 103 correspondingly receives (203), per arrow 112 in FIG. 1. The publisher device 102 can provide a content identifier of the content 110 that the publisher wishes to make available for print on demand on the portal device 103. The publisher device 102 may provide other information regarding the content as well.

The portal device 103 does not receive the content 110 in complete, unencrypted form, however. For example, in the case of text-oriented content, the publisher device 102 may provide just the first few pages of a document, the abstract of the document, the front and back covers of a book, and so on. As another example, in the case of image-oriented content, the publisher device 102 may provide a watermarked, lower-resolution, and/or smaller-sized (e.g., "thumbnail") version of an image.

The publisher device 102 advertises the availability of the content 110 (204). As such, for instance, the user device 104 may access the portal device 103 via the network 108 to browse the available print on demand content, and identify the content 110 that it wishes to receive a printed copy of (206), per bi-directional arrow 114 in FIG. 1. The user device 104 locks and sends a blockchain transaction of a request to print the content 110 to the publisher device 102 via the blockchain ledger 106 (208), per arrow 116 in FIG. 1. The blockchain transaction is locked with a hash of a public transaction key 168A of the publisher device 102. The blockchain transaction includes the identifier of the content 110 in plaintext (i.e., unencrypted), or the identifier may be encrypted with the public encryption-signature key 164A of the publisher device 102.

The request to print the content 110 does not identify the printing device 105, or any other printing device, that the user device 104 intends to use to print the content 110. The user of the device 104 may not know at the time of sending the blockchain transaction in question which printing device he or she intends to use. The request to print can include payment information for paying for the right to print the content 110, which is encrypted with the public encryption-signature key 164A of the publisher device 102. The request to print can include the specified number of copies of the content 110 to be printed, as well as other parameters governing how the content 110 is to be printed: paper type, paper size, resolution, in color or black-and-white, printing technology, finishing options (e.g., stapling, three-hole punch, binding, etc.) and so on. Such information may or may not be encrypted.

The publisher device 102 receives and unlocks the blockchain transaction (210). Specifically, the publisher device 102 unlocks the transaction with the public transaction key 168A of the transaction, which is the key 168A having the hash to which the transaction was addressed on the blockchain ledger 106. The identifier of the content 110, if encrypted, is decrypted with the private encryption-signature key 164B of the publisher device 102. Any other information within the blockchain transaction that is encrypted is likewise decrypted with the private key 164B.

The publisher device 102 generates a print identifier 119 and a print stream 126 of the content 110 to be printed (212). The print identifier 119 uniquely identifies the print stream 126 of the content 110 to be printed on behalf of the user device 104. The print identifier 119 may be a universally unique identifier (UUID), a globally unique identifier (GUID), a serial number and so on.

The generated print stream 126 of the content 110 indicates the number of copies of the content 110 to be printed, as well as other parameters governing how the content 110 is to be printed. In one implementation, the print stream 126 may be a rasterization or other rendering of the content 110 in accordance with these parameters. For example, if two copies of a four-page document are to be printed, then the print stream 126 includes a total of eight pages. Similarly, the rasterization or other rendering may graphically render any images in accordance with the specified resolution and color constraints. The print stream 126 of the content 110 thus differs from the content 110 itself, in that it is a particular instantiation of the content 110 for printing in a specified manner.

The publisher device 102 digitally signs the generated print stream 126 of the content 110 with its private encryption-signature key 164B (214). The publisher device 102 generates a hash 118 of the signed print stream 126 (216).

The publisher device 102 may generate the hash 118 using a one-way, irreversible hash function so that the print stream 126 is not recoverable from the hash 118.

In FIG. 2B, the publisher device 102 performs the right column and the user device 104 performs the left column. The publisher device 102 securely sends the hash 118 to the user device 104 (218), which securely receives the hash 118 (220), per arrow 120 in FIG. 1. For example, the publisher device 102 may encrypt the hash 118 with the public encryption-signature key 174A of the user device 104 and send the encrypted hash 118 to the user device 104 within an email message or in another manner. The user device 104 then decrypts the encrypted hash 118 using its private encryption-signature key 174B. In a different implementation, the publisher device 102 may securely send the hash 118 to the user device 104 via a blockchain transaction using the blockchain ledger 106.

The user device 104 generates a lock script (222) and a hash 150 of this lock script (224). The user device 104 specifically uses the lock script to generate the hash 150 from a public transaction key 178A of the user device 104 and the signed print stream hash 118. The lock script is thus similar to a lock script used to generate a hash of a public transaction key, but generates a hash from both the public transaction key 178A and the signed print stream hash 118. The lock script hash 150 is similar to the type of hash that is output when a blockchain transaction is locked, but there is no such transaction in part 224. The user device 104 securely sends the lock script hash 150 to the publisher device 102 (226), which receives this hash 150 (228), per arrow 152 in FIG. 1.

For example, the user device 104 may encrypt the lock script hash 150 with the public encryption-signature key 164A of the publisher device 102 and send the encrypted hash 150 to the publisher device 102 within an email message or in another manner. The publisher device 102 then decrypts the encrypted hash 150 of the script using its private encryption-signature key 164B. In a different implementation, the user device 104 may securely send the lock script hash 150 to the publisher device 102 via a blockchain transaction using the blockchain ledger 106.

The publisher device 102 locks and sends a blockchain transaction of a right to print the print stream 126, including the print identifier 119 and an address 131 of the publisher device 102, via the blockchain ledger 106 to the user device 104 (230), per arrow 154 in FIG. 1. The blockchain transaction is digitally signed with the private transaction key 168B corresponding to the public transaction key 168A having the hash to which the blockchain transaction of part 208 of FIG. 2A was locked. This public transaction key 168A is provided with the blockchain transaction of part 230.

The blockchain transaction is locked with the lock script hash 150, instead of a hash of a public transaction key 178A of the user device 104. The publisher device address 131 is a hash generated using a public transaction key 168A of the publisher device 102. The publisher device address 131 is specifically for the print identifier 119, and is the address 131 at which the publisher device 102 is to receive an authorization request to print the print stream 119 from a printing device to which the user device 104 delegates a right to print the print stream 119.

This public transaction key 168A is for the blockchain transaction of part 230, and is different than the public transaction key 168A that is for the blockchain transaction 208 of FIG. 2A. The publisher device address 131 is similar to the type of hash that is output when a blockchain transaction is locked and sent to the publisher device 102, but there is no such transaction in part 230. The publisher device address 131 is encrypted with the public signature-encryption key 174A of the user device 104. The print identifier 119 may be unencrypted, or encrypted with the public key 174A.

The user device 104 receives and unlocks the blockchain transaction (232). The user device 104 uses the previously generated lock script to unlock the blockchain transaction with the signed print stream hash 118 and the public transaction key 178A that was used to generate the lock script hash 150. The user device 104 decrypts the publisher device address 131 and the print identifier (if encrypted) with its private signature-encryption key 174B.

The user device 104 now has a delegable right to print the print stream 126 of the content 110. The user device 104 does not receive the print stream 126 of the content 110, nor does it receive the complete content 110 in another unencrypted digital form from the publisher device 102. The user device 104 can delegate the received right to print to a printing device, such as the printing device 105, for printing the print stream 126 of the content 110 on behalf of the user of the user device 104.

In the example of FIG. 1, the user device 104 delegates the right to print the print stream 126 to the printing device 105. The process by which the right to print is delegated from the user device 104 to the printing device 105 for printing the print stream 126 on behalf of the user is described with reference to FIGS. 3A, 3B, and 3C, which show an example method 300. The method 300 can be implemented as program code stored on a non-transitory computer-readable data storage medium and executable by a processor, such as that of the device 102, 103, 104, or 105.

In FIG. 3A, the user device 104 performs the left column, the publisher device 102 performs the right column, and the printing device 105 performs the middle column. The user device 104 generates a hash 121 of the received hash 118 of the signed print stream 126 (302). The user device 104 may generate the hash 121 using a one-way, irreversible hash function so that the hash 118 is not recoverable from the hash 121.

The user device 104 locks and send a blockchain transaction of the right to print, including the print identifier 119, the publisher device address 131, and the hash 121 of the hash 118, via the blockchain ledger 106 to the printing device 105 (304), per arrow 122 in FIG. 1. The blockchain transaction is digitally signed with the private transaction key 178B corresponding to the public transaction key 178A on which basis (along with the print stream hash 118) the lock script hash 150 was generated in part 224. This public transaction key 178A is provided with the blockchain transaction of part 304.

The blockchain transaction is locked with a hash of a public transaction key 188A of the printing device 105. The hash 118 is not sent and is otherwise not available to the printing device 105. The publisher device address 131 and the hash 121 of the hash 118 are encrypted with the public signature-encryption key 184A of the printing device 105. The print identifier 119 may or may not be encrypted. The user device 104 has thus initiated delegation of the right to print the print stream 126 to the printing device 105.

The printing device 105 receives and unlocks the blockchain transaction (306). Specifically, the printing device 105 unlocks the transaction with the public transaction key 188A having the hash with which the transaction was locked. The printing device decrypts the print identifier 119, the publisher device address 131, and the hash 121 of the hash 118 using its private signature-encryption key 184A.

The printing device 105 locks and sends a blockchain transaction of an authorization request to print the print stream 126, including the print identifier 119 and the hash 121 of the hash 118, via the blockchain ledger 106 to the publisher device 102 (312), per arrow 124 in FIG. 1. The transaction is digitally signed with the private transaction key 188B corresponding to the public transaction key 188A having the hash to which the blockchain transaction of part 304 was locked. This public transaction key 188A is provided with the blockchain transaction of part 312. The blockchain transaction is locked with the publisher device address 131 within the blockchain transaction from the user device 105, instead of hash of a public transaction key 168A of the publisher device 102 (although the address 131 was itself generated with a public transaction key 168A). The hash 121 of the hash 118 is encrypted with the public encryption-signature key 164A of the publisher device 102. The print identifier 119 may be unencrypted, or encrypted with the public key 164A.

The publisher device 102 receives and unlocks the blockchain transaction (314). The publisher device 102 unlocks the blockchain transaction using the public transaction key 168B corresponding to the publisher device address 131 to which the transaction was locked. (The address 131 is a hash of this public transaction key 168B.) The publisher device 102 decrypts the print identifier 119 (if encrypted) and the hash 121 of the hash 118 with its private encryption-signature key 164A.

The publisher device 102 verifies the print identifier 119 and the received hash 121 of the hash 118 (318). The publisher device 102 can verify the print identifier 119 by verifying that the identifier 119 corresponds to the publisher device address 131 at which the blockchain transaction was received. The publisher device 102 can verify the received hash 121 by retrieving the hash 118 that the device 102 generated for the signed print stream 126 identified by the received print identifier 119, and itself generating the hash 121 to verify that the generated hash 121 matches the received hash 121.

In FIG. 3B, the publisher device 102 performs the left column and the portal device 103 performs the right column. The publisher device 102 encrypts the previously generated print stream 126, as digitally signed with the private encryption-signature key 164B of the publisher device 102, with the public encryption-signature key 184A of the printing device 105 (320). The publisher device 102 uploads the encrypted and signed print stream 126 to the portal device 103 via the network 108 (322), per arrow 128 in FIG. 1.

Upon receiving the encrypted and signed print stream 126 (324), the portal device 103 provides the publisher device 102, via the network 108, with a link 130 at which the print stream 126 can be downloaded from the portal device 103 over the network 108 (326), per arrow 132 in FIG. 1. The portal device 103 stores just an encrypted version of the print stream 126, and is unable to decrypt the print stream 126 because it does not have access to the private key 184B of the printing device 105. The content 110 therefore remains inaccessible at the portal device 103, and the publisher device 102 does not provide the portal device 103 with the full content 110 in unencrypted form.

Upon receiving the link 130 to the print stream 126 at the portal device 103 (328), the publisher device 102 encrypts the link 130 with the public encryption-signature key 184A of the printing device 105 (330). The publisher device 102 locks and sends a blockchain transaction of an authorization to print the print stream 126, including the print identifier 119 and the encrypted link 130, to the printing device 105 via the blockchain ledger 106 (332), per arrow 136 in FIG. 1. The blockchain transaction is signed with the private transaction key 1688 corresponding to the public transaction key 168A that corresponds to the publisher device address 131 with which the transaction of part 312 of FIG. 3A was locked. This public transaction key 168A is provided with the blockchain transaction of part 314.

The blockchain transaction is locked with a hash of a public transaction key 188A of the printing device 105. This public transaction key 188A is for the blockchain transaction of part 332, and is different than the public transaction key 188A that is for the blockchain transaction of part 304 of FIG. 3A. The print identifier 119 may be unencrypted, or encrypted with the public encryption-signature key 184A of the printing device 105. The print stream 126 is not included within the authorization to print. With the transmission of the authorization to print, the delegation of the delegable right to print from the user device 104 to the printing device 105 is now successfully complete.

In another implementation, the blockchain transaction of part 332 may not be locked when posted on the blockchain ledger 106, and thus is retrievable by any device and not just the printing device 105. However, just the printing device 105 can decrypt the link 130, because just the printing device 105 has the private encryption-signature key 184B corresponding to the public encryption-signature key 184A with which the link 130 was encrypted. To this extent, then, it is still stated that in effect the encrypted link 130 is sent to the printing device 105.

Figure 3C:
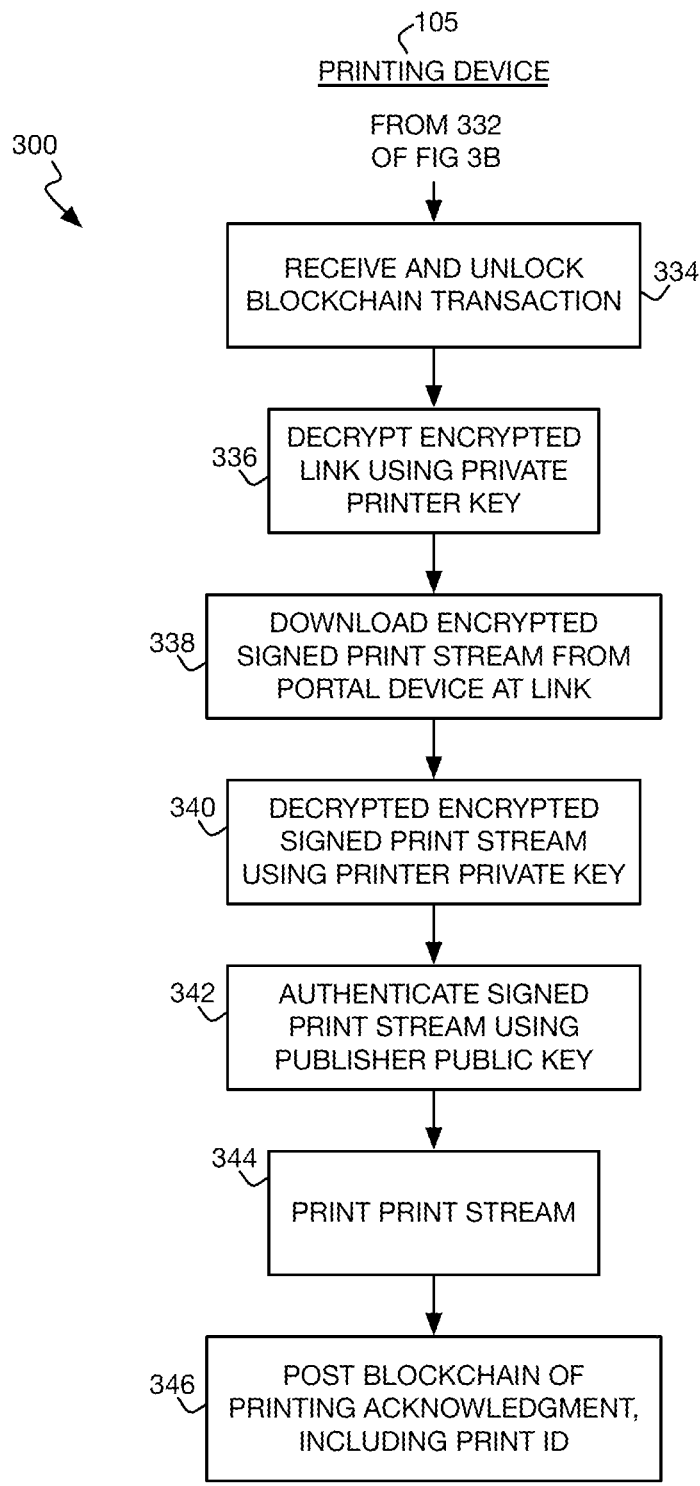

In FIG. 3C, the printing device 105 performs the sole column. The printing device 105 receives and unlocks the blockchain transaction of the authorization to print the print stream 126 from the blockchain ledger 106 (334). The printing device 105 unlocks the blockchain transaction using the public transaction key with the public transaction key 188A having the hash with which the transaction was locked. The printing device 105 decrypts the link 130 using its private encryption-signature key 184B (336). The printing device 336 then accesses the portal device 103 via the network 108 at the link 130 to download the encrypted and signed print stream 126 (338), per arrow 134 in FIG. 1.

The printing device 105 decrypts the print stream 126 using its private encryption-signature key 184B (340). Because the print stream 126 is encrypted with the public encryption-signature key 184A of the printing device 105, just the printing device 105 can decrypt the print stream 126. Any other device or party retrieving the encrypted and signed print stream 126 at the portal device 103 via the link 130 is unable to recover the content 110 of the print stream 126.

The printing device 105 authenticates the signed print stream 126 against the public encryption-signature key 164A of the publisher device 102 (342), and can then print the print stream 126 for the user device 104 (344). The printing device 105 can post a blockchain transaction of an acknowledgment of successful printing of the print stream 126, including the print identifier 119, to the blockchain ledger 106 (346), per arrow 138 in FIG. 1. The blockchain transaction is not locked, and is retrievable by any device, such as for provenance, auditing, and other purposes. The blockchain transaction can be digitally signed with the private transaction key 188B corresponding to the public transaction key 188A having the hash to which the blockchain transaction of part 332 was locked. This public transaction key 188A is provided with the blockchain transaction posted to the blockchain ledger 106 in part 346. The print identifier 119 is provided in plaintext, and is not encrypted.

The described process for providing a delegable right to print to the user device 104 and delegating the right to print to the printing device 105 is a zero-trust process. The publisher device 102 does not have to trust the portal device 103 or the user device 104 with its content 110, because the publisher device 102 does not provide the complete content 110 in unencrypted form to either device 103 or 104. The user device 104 is not provided with the content 110, including the print stream 126 thereof, at all. The portal device 103 is provided the print stream 126, but as encrypted with the public encryption-signature key 184A of the printing device 105, and therefore cannot decrypt the print stream 126.

The printing device 105 does have access to the print stream 126 in unencrypted form, since the printing device 105 prints the print stream 126. However, the printing device 105 may have a trusted platform module (TPM) or other secure hardware that downloads, stores, and prints the print stream 126. It can be guaranteed that the printing device 105 delete the print stream 126 after printing, without any prior assurance of trust having to be established between the publisher device 102 and the printing device 105. The TPM or other secure hardware further securely stores the key pairs 182 and 186 of the printing device 105.

The publisher device 102 maintains a self-sovereign identity as to the content 110 in the described process because the publisher device 102 does not have to share the content 110 in any encrypted form in which the portal device 103 is able to decrypt the content 110. When initially indicating availability of the content 110 to the portal device 103, the publisher device 102 does not share the complete content 110 in encrypted from to the portal device 103. The publisher device 102 also does not share its private encryption-signature key 164B (and may not share any other private cryptographic key of the publisher device 102) with the portal device 103. When the print stream 126 is uploaded to the portal device 103, it is encrypted with the public encryption-signature key 184A of the printing device 105 and thus not decryptable by the portal device 103.

Provenance is established in the described process due to the usage of blockchain transactions for communication among the publisher device 102, the user device 104, and the printing device 105. The recording of the blockchain transactions within the blockchain ledger 106 ensures that the transactions are indelible and immutable: they cannot be deleted nor changed. Therefore, should the right to print acquisition and delegation process have to be later audited for regulatory or other reasons, the trueness of the transactions is guaranteed.

Figure 4:
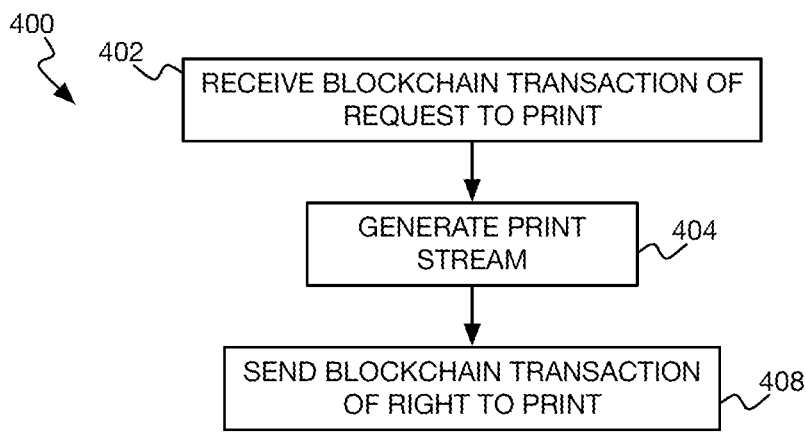
FIG. 4 is a flowchart of an example method.

FIG. 4 shows an example method 400. The method 400 is performable by a publisher device, like the publisher device 102 of FIG. 1. The publisher device receives a blockchain transaction of a request to print content from a user device (402), like the user device 104 of FIG. 1. The publisher device generates a print stream of the content (404). The publisher device sends a blockchain transaction of a right to print the print stream to the user device (408). The right to print is delegable by the user device to a printing device to print the print stream.

Figure 5:
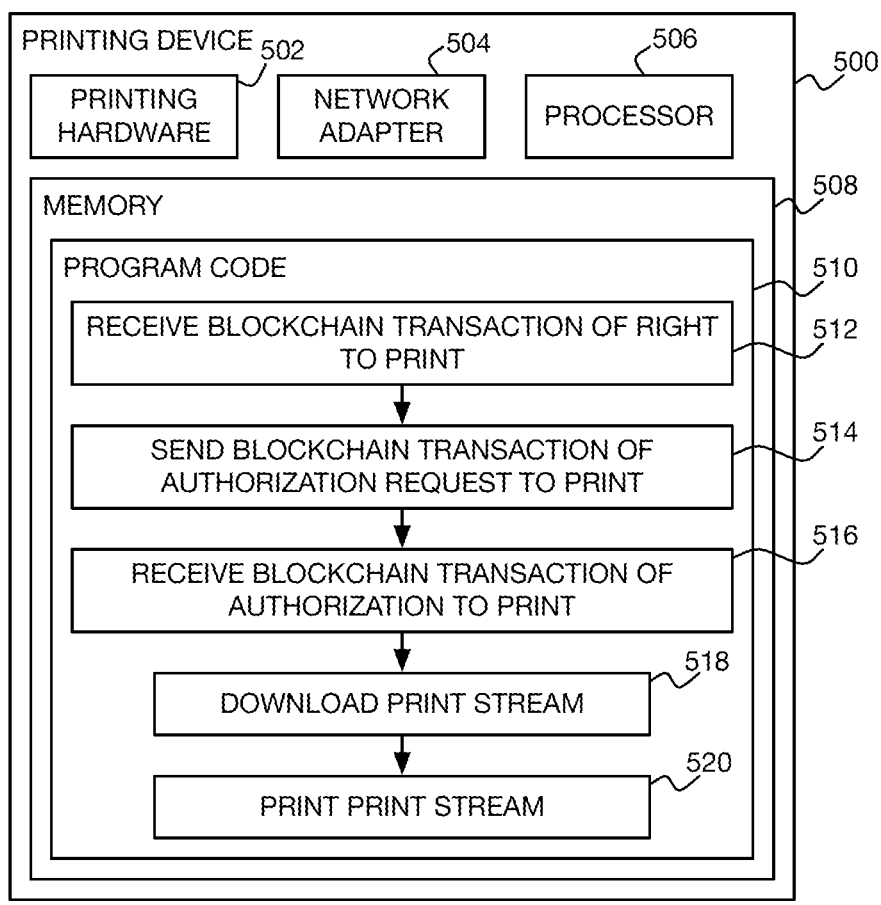
FIG. 5 is a diagram of an example printing device.

FIG. 5 shows an example printing device 500, such as the printing device 105 of FIG. 1. The printing device 500 includes printing hardware 502, such as laser-printing hardware or inkjet-printing hardware, and includes the hardware and software components by which the printing device 500 prints hardcopy of content. The printing device 500 includes a network adapter 504 to communicatively connect to a publisher device and a user device via a blockchain ledger, and to a portal device, such as over a network like the network 108 of FIG. 1. The publisher, user, and portal devices may respectively be the devices 102, 104, and 103 of FIG. 1, and the blockchain ledger may be the blockchain ledger 106 of FIG. 1.

The printing device 500 includes a processor 506 and a memory 508 storing program code 510. The processor 506 and the memory 508 may be part of a TPM of the printing device 500, or other secure hardware of the device 500. The program code is executable by the processor 506 to perform processing. The processing includes receiving a blockchain transaction of a right to print a print stream of content from the user device (512), and sending a blockchain transaction of an authorization request to print the print stream to the publisher device (514).

The processing includes receiving a blockchain transaction of an authorization to print the print stream, including a link to the print stream at the portal device, from the publisher device (516). Receipt of this authorization corresponds to successful delegation of the right to print from the user device to the printing device 500. The processing includes downloading the print stream from the publisher device at the link (518), and printing the print stream using the printing hardware.

Figure 6:
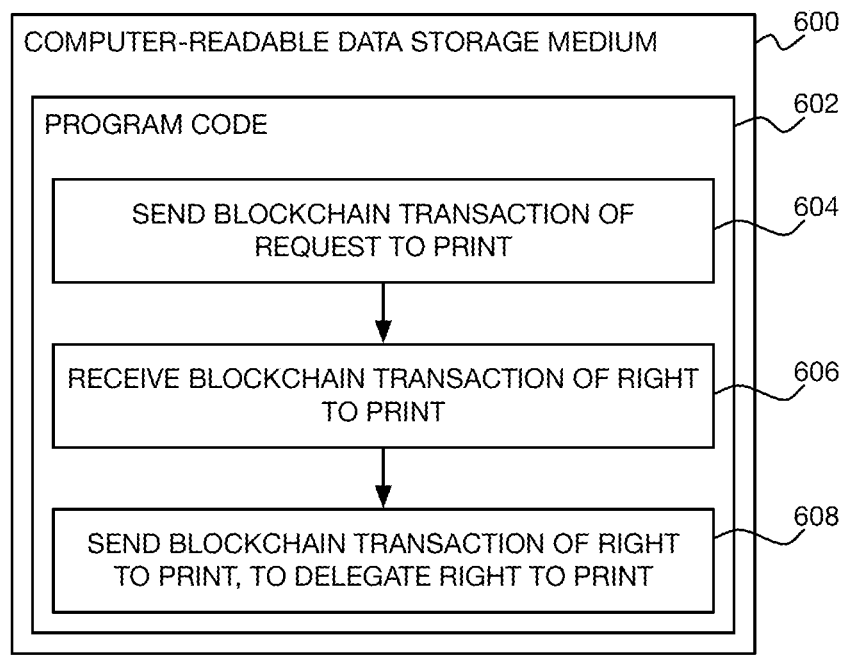
FIG. 6 is a diagram of an example computer-readable data storage medium.

FIG. 6 shows an example non-transitory computer-readable data storage medium 600 storing program code 602 executable by a user device, such as the user device 104 of FIG. 1, to perform processing. The processing includes sending a blockchain transaction of a request to print content to a publisher device (604), such as the publisher device 102 of FIG. 1. The processing includes receiving a blockchain transaction of a right to print a print stream of the content from the publisher device (606). The processing includes sending a blockchain transaction of the right to print to a printing device, such as the printing device 105 of FIG. 1, to delegate the right to print from the user device to the printing device (608).

Techniques have been described herein for providing a zero-trust architecture in which users and print on demand, content, and printing service providers do not have to trust one another. Via these techniques, a user receives a delegable right to print from a publisher device that it can delegate to a printing device. The content providers have self-sovereign identities, and the techniques ensure provenance from initial user device request to print content sent to a publisher device through final publisher device authorization to print the content provided to a printing device.

I claim:
1. A method comprising:
receiving, by a publisher device, a blockchain transaction of a request to print content from a user device;
generating, by the publisher device, a print stream of the content;
generating, by the publisher device, a hash of the print stream;
securely sending, by the publisher device, the hash to the user device;
sending, by the publisher device, a blockchain transaction of a right to print the print stream to the user device;
receiving, by the publisher device, a blockchain transaction of an authorization request to print the print stream, including a hash of the hash, from a printing device;

verifying, by the publisher device, the received hash of the hash to authorize the printing device to print the print stream for the user;

uploading, by the publisher device, the print stream to a portal device; and sending, by the publisher device, a blockchain transaction of an authorization to print the print stream, including a link to the print stream at the portal device to the printing device, corresponding to successful delegation of the right to print from the user device to the printing device.

2. The method of claim 1, further comprising:

locking, by the publisher device, the blockchain transaction of the right to print prior to sending the blockchain transaction of the right to print to the user device.

3. The method of claim 1, further comprising:

signing, by the publisher device, the print stream with a private cryptographic key of the publisher device prior to generating the hash of the print stream.

4. The method of claim 1, further comprising:

encrypting, by the publisher device, the print stream with a public cryptographic key of the printing device prior to uploading the print stream to the portal device.

5. The method of claim 1, wherein the blockchain transaction of the authorization request is locked, the method further comprising:

unlocking, by the publisher device, the blockchain transaction of the authorization request.

6. A printing device comprising:

printing hardware;

a network adapter to communicatively connect to a publisher device and a user device via a blockchain ledger, and to a portal device;

a processor;

a memory storing program code executable by the processor to:

receive a blockchain transaction of a right to print a print stream of content, including a hash of a hash of the print stream, from the user device;

send a blockchain transaction of an authorization request to print the print stream, including the hash of the hash, to the publisher device;

receive a blockchain transaction of an authorization to print the print stream, including a link to the print stream at the portal device, from the publisher device, corresponding to successful delegation of the right to print from the user device to the printing device;

download the print stream from the publisher device at the link; and print the print stream using the printing hardware.

7. The printing device of claim 6, wherein the print stream is signed with a private cryptographic key of the publisher device as downloaded from the publisher device, and the program code is further executable by the processor to:

authenticate the print stream against a public cryptographic key of the publisher device prior to printing the print stream.

8. The printing device of claim 6, wherein the program code is further executable by the processor to:

lock the blockchain transaction of the authorization request prior to sending the blockchain transaction of the authorization transaction to the publisher device.

9. The printing device of claim 6, wherein the link to the print stream at the portal device is encrypted with a public cryptographic key of the printing device, and the program code is executable by the processor to further:

decrypt the link using a private cryptographic key of the printing device.

10. The printing device of claim 9, wherein the print stream at the portal device is encrypted with a public cryptographic key of the printing device, and the program code is executable by the processor to further:

decrypt the print stream using a private cryptographic key of the printing device.

11. A non-transitory computer-readable data storage medium storing program code executable by a user device to perform processing comprising:

sending a blockchain transaction of a request to print content to a publisher device;

securely receiving a hash of a print stream of the content from the publisher device;

receiving a blockchain transaction of a right to print the print stream of the content, from the publisher device;

generating a hash of the hash of the print stream;

sending a blockchain transaction of the right to print, including the hash of the hash, to a printing device to delegate the right to print from the user device to the printing device.

* * * * *